(12) United States Patent
Zhang et al.

(10) Patent No.: US 8,019,899 B2
(45) Date of Patent: Sep. 13, 2011

(54) DELIVERING PARTIALLY PROCESSED RESULTS BASED ON SYSTEM METRICS IN NETWORK CONTENT DELIVERY SYSTEMS

(75) Inventors: Zengyan Zhang, San Jose, CA (US); George E. Mavromatis, Mountain View, CA (US); Jinhui Liu, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 170 days.

(21) Appl. No.: 12/200,529

(22) Filed: Aug. 28, 2008

(65) Prior Publication Data
US 2010/0057939 A1    Mar. 4, 2010

(51) Int. Cl.
*G06F 15/16* (2006.01)
(52) U.S. Cl. ......... 709/248; 709/227; 370/230; 718/100
(58) Field of Classification Search ............. 709/203, 709/227
See application file for complete search history.

(56) References Cited

U.S. PATENT DOCUMENTS

| | | | |
|---|---|---|---|
| 7,363,650 B2 | 4/2008 | Moriconi et al. | 726/1 |
| 7,373,524 B2 | 5/2008 | Motsinger et al. | 713/194 |
| 7,397,759 B2 | 7/2008 | Tan et al. | 370/216 |
| RE40,459 E | 8/2008 | Hawkins et al. | 709/219 |
| 7,408,873 B2 | 8/2008 | Geile et al. | 370/208 |
| 7,412,533 B1 | 8/2008 | Johnson et al. | 709/231 |
| 2005/0044234 A1* | 2/2005 | Coughlin et al. | 709/227 |
| 2005/0160425 A1* | 7/2005 | Falsett et al. | 718/100 |
| 2007/0033167 A1* | 2/2007 | Basu et al. | 707/3 |
| 2008/0013450 A1* | 1/2008 | Worley et al. | 370/230 |

\* cited by examiner

*Primary Examiner* — Jude J Jean Gilles
(74) *Attorney, Agent, or Firm* — Berkeley Law & Technology Group, LLP

(57) ABSTRACT

Methods, apparatuses and systems directed to processing client requests in distributed systems. Particular implementations of the invention are directed to allowing application servers to return partially processed results after having consumed a time slice allocation based on performance estimates, network performance metrics, and/or system performance metrics.

31 Claims, 8 Drawing Sheets

DELIVERING PARTIALLY PROCESSED RESULTS BASED ON SYSTEM METRICS IN NETWORK CONTENT DELIVERY SYSTEMS

TECHNICAL FIELD

The present disclosure generally relates to distributed computing systems.

BACKGROUND

Network content delivery systems generally involve delivering information to web site users including, but not limited to, reports, statements, charts, graphs, ads, or news stories. Such information may require extensive processing before delivery and may involve database searching, formatting, calculation, storage, retrieval, transmission, and display. In many cases, delivering information to a web browser may involve the active involvement of a number of web servers and application servers that each play a role in delivering all or part of the content.

The user's interface experience, and advertising opportunities, may be dramatically affected by a number of factors including the amount of processing required to deliver the information to a client browser, the complexity of the network, the dynamically changing environment, or the complexity of the information itself. In some cases, various servers along the information chain may wait so long for a response that they time out, which produces a less than desirable result for the client web browser.

SUMMARY

The present invention provides methods, apparatuses and systems directed to processing client requests in distributed systems. Particular implementations of the invention are directed to allowing application servers to return partially processed results after having consumed a time slice allocation based on performance estimates, network performance metrics, and/or system performance metrics.

Particular implementations of this invention may provide one or more technical advantages. For example, a technical advantage of one implementation may be that the likelihood the client application will receive no results is reduced or eliminated.

Particular implementations of the invention may include none, some, or all the above technical advantages. One or more other technical advantages may be readily apparent to one skilled in the art from the figures, descriptions, and claims included herein.

DESCRIPTION OF EXAMPLE EMBODIMENT(S)

A. Overview

Figure 1:
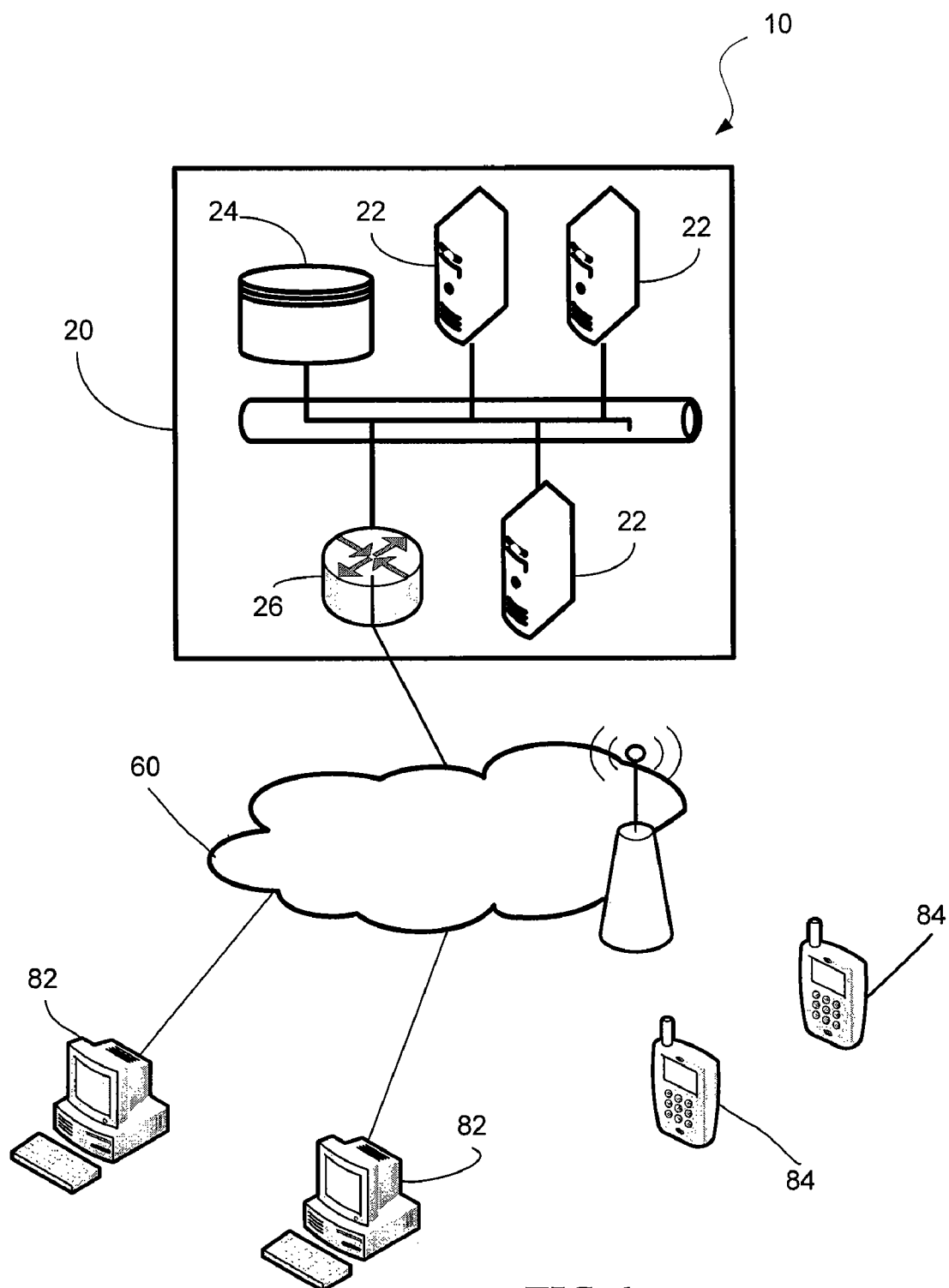
FIG. 1 is a schematic diagram that illustrates an example network environment in which particular implementations of the invention may operate.

Particular embodiments of the present invention are related to systems that provide content, such as ad content, to users of a network. Typically, content-driven systems require all the content for a given request to be assembled or selected before it is delivered to a network client. Such content may need to be compiled from a number of disparate sources prior to assembly and delivery. Each source may be suffering under workloads that range from light to extreme when the request is received. The request may initiate actions that range from simple to complex. The network environment may range in configuration from simple to complex. The amount of network activity may range from quiescent to saturated. The information requested may be simple or complex. The combination of these factors may result in long delays and/or may result in server time-outs that impede or preclude the delivery of any content to the network client. Typically, the end result is diminished user experience and decrease in revenue opportunities for the service provider.

As discussed in more detail below, particular implementations of the invention reduce the likelihood of unacceptable delays by forcing each data or content source to return a partially or completely processed set of results within a budgeted time period. The budget may be established and/or adjusted based on real-time environmental metrics that account for the previously mentioned factors. Partially processed results may include the best possible results that can be attained under the constraint of the time budget.

In a particular implementation, performance estimates related to a particular type of request and/or content source may be used to establish an initial time budget. Alternatively, a default time budget may be used. Further, a single time budget may be established globally for all content sources or a time budget may be established for each content source individually. Network latency may be measured and used to adjust the time budget allocated to a particular source. Further adjustments to the time budget can be made based on system activity. The content source may comply with the time budget by returning a partially processed set of results once the time budget has been exhausted.

The present invention can be implemented in a variety of manners, as discussed in more detail below. Other implementations of the invention may be practiced without some or all of specific details set forth below. In some instances, well known structures and/or processes have not been described in detail so that the present invention is not unnecessarily obscured.

A.1. Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

As FIG. 1 illustrates, a particular implementation of the invention can operate in a network environment comprising network application hosting site 20, such as an informational web site, social network site and the like. Although FIG. 1 illustrates only one network application hosting site, implementations of the invention may operate in network environments that include multiples of one or more of the individual systems and sites disclosed herein. Client nodes 82, 84 are operably connected to the network environment via a network service provider or any other suitable means.

Network application hosting site 20 is a network addressable system that hosts a network application accessible to one or more users over a computer network. The network application may be an informational web site where users request and receive identified web pages and other content over the computer network. The network application may also be a search platform, an on-line forum or blogging application where users may submit or otherwise configure content for display to other users. The network application may also be a social network application allowing users to configure and maintain personal web pages. The network application may also be a content distribution application, such as Yahoo! Music Engine®, Apple® iTunes®, podcasting servers, that displays available content, and transmits content to users.

Network application hosting site 20, in one implementation, comprises one or more physical servers 22 and content data store 24. The one or more physical servers 22 are operably connected to computer network 60 via a router 26. The one or more physical servers 22 host functionality that provides a network application (e.g, a news content site, etc.) to a user. In one implementation, the functionality hosted by the one or more physical servers 22 may include web or HTTP servers, ad serving systems, content delivery systems, application servers, and the like. Still further, some or all of the functionality described herein may be accessible using an HTTP interface or presented as a web service using SOAP or other suitable protocols.

Content data store 24 stores content as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

Network application hosting site 20, in one implementation, provides web pages, such as front pages, that include an information package or module describing one or more attributes of a network addressable resource, such as a web page containing an article or product description, a downloadable or streaming media file, and the like. The web page may also include one or more ads, such as banner ads, text-based ads, sponsored videos, games, and the like. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control.

Figure 2:
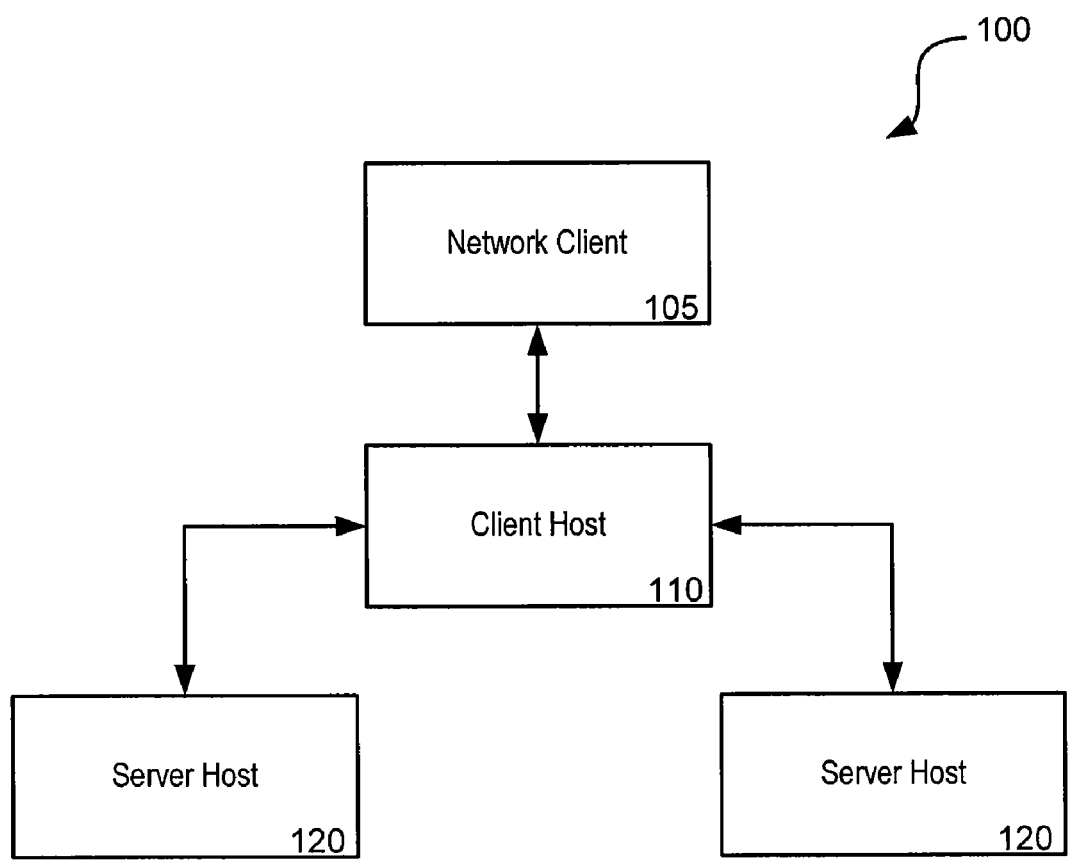
FIG. 2 is a schematic diagram illustrating a client host environment to which implementations of the invention have application.

FIG. 2 illustrates the functional modules of a client host server environment 100 within network application hosting site 20 according to one particular implementation. As FIG. 2 illustrates, network application hosting site 20 may comprise one or more network clients 105 and one or more client hosts 110 operating in conjunction with one or more server hosts 120. The foregoing functional modules may be realized by hardware, executable modules stored on a computer readable medium, or a combination of both. The functional modules, for example, may be hosted on one or more physical servers 22 and/or one or more client computers 82, 84.

Network client 105 may be a web client hosted on client computers 82, 84, a client host 110 located on physical server 22, or a server host located on physical server 22. Client host 110 may be an executable web or HTTP server module that accepts HyperText Transport Protocol (HTTP) requests from network clients 105 acting as a web clients, such web browser client applications hosted on client computers 82, 84, and serving HTTP responses including contents, such as Hyper-Text Markup Language (HTML) documents and linked objects (images, advertisements, etc.). Client host 110 may also be an executable module that accepts Simple Object Access Protocol (SOAP) requests from one or more client hosts 110 or one or more server hosts 120. In one implementation, client host 110 has the capability of delegating all or part of single or multiple requests from network client 105 to one or more server hosts 120. Client host 110, as discussed above, may operate to deliver a network application, such as an informational web page or an internet search service.

In a particular implementation, client host 110 may act as a server host 120 to another client host 110 and may function to further delegate requests to one or more server hosts 120 and/or one or more client hosts 110. Server hosts 120 host one or more server applications, such as an ad selection server, sponsored search server, content customization server, and the like.

A.2. Client Nodes & Example Protocol Environment

Client node is a computer or computing device including functionality for communicating over a computer network. A client node can be a desktop computer 82, laptop computer, as well as mobile devices 84, such as cellular telephones, personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within the web pages 30 and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The networked systems described herein can communicate over the network 60 using any suitable communications protocols. For example, client nodes 82, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

A.3. Example Operation

Figure 3:
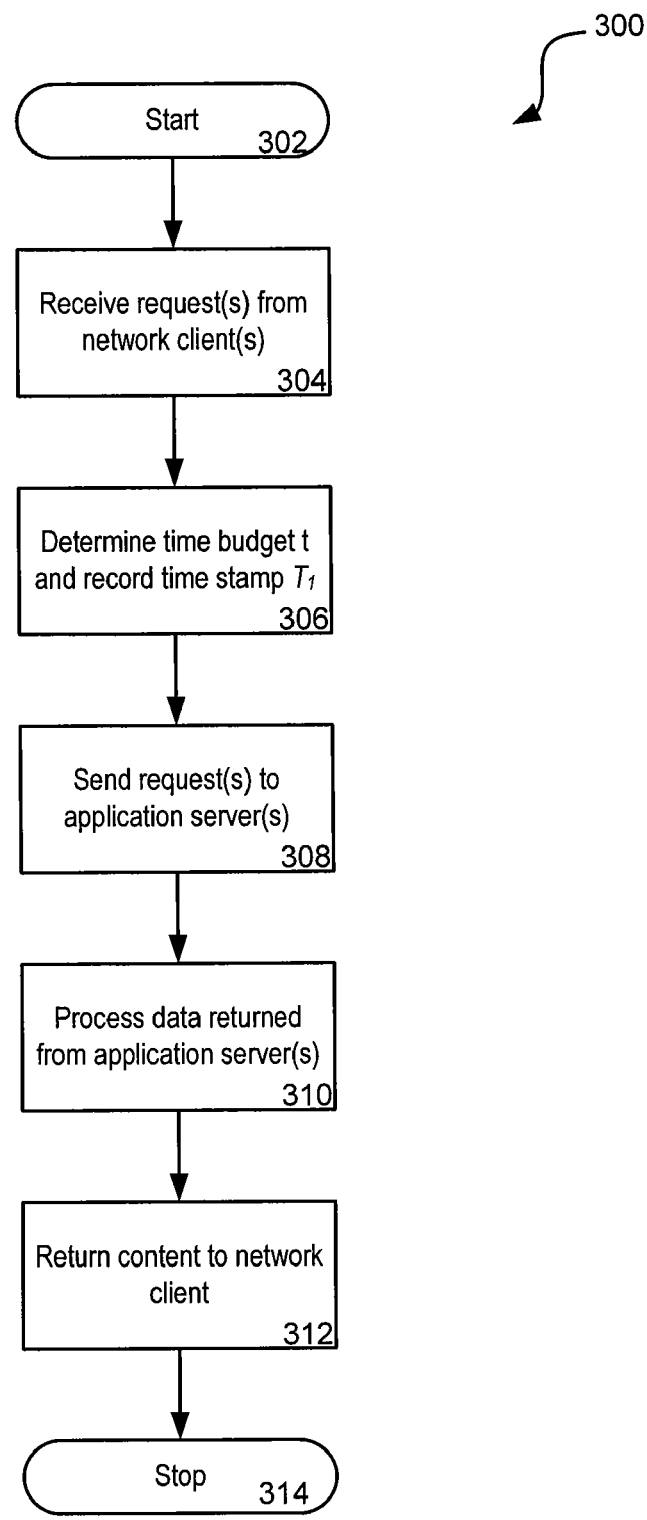
FIG. 3 is a functional block diagram illustrating the functionality of the client host server in an example network content delivery system to which implementations of the invention have application.

FIG. 3 illustrates an example process 300 that can be implemented by client host 110 to set a time budget t, allow for adjustment of the time budget t, and generate or delegate requests to one or more server hosts 120. As FIG. 3 illustrates, in a particular implementation, client host 110 initiates (302) process 300 when it receives requests (304) from one or more network clients 105. The process 300 may involve generation of one or more requests or calls to one or more of the server hosts 120 for data. For example, client host 110 may request one or more ads from a server host 120. Client host 110 then determines a time budget t and records a client host time stamp $T_1$ (306). In a particular implementation, the time budget t may be determined globally for all requests that are to be delegated to server hosts 120 or it may be determined individually for each request that is to be sent. Time budget t may be a predetermined value or may be dynamically calculated based on application-related parameters. Client host time stamp $T_1$ may be recorded by client host 110 as a request is sent to server host 120. The requests are sent (308) to one or more application server hosts 120. Time budget t may be included in the request. Time stamp $T_1$ may also be included in the request. In a particular implementation, requests may be sent to one or more server hosts 120 synchronously or asynchronously. Once the data are returned from the server hosts 120, they are processed (310) and returned (312) to the requesting network clients 105. Process 300 then terminates (314).

Figure 4:
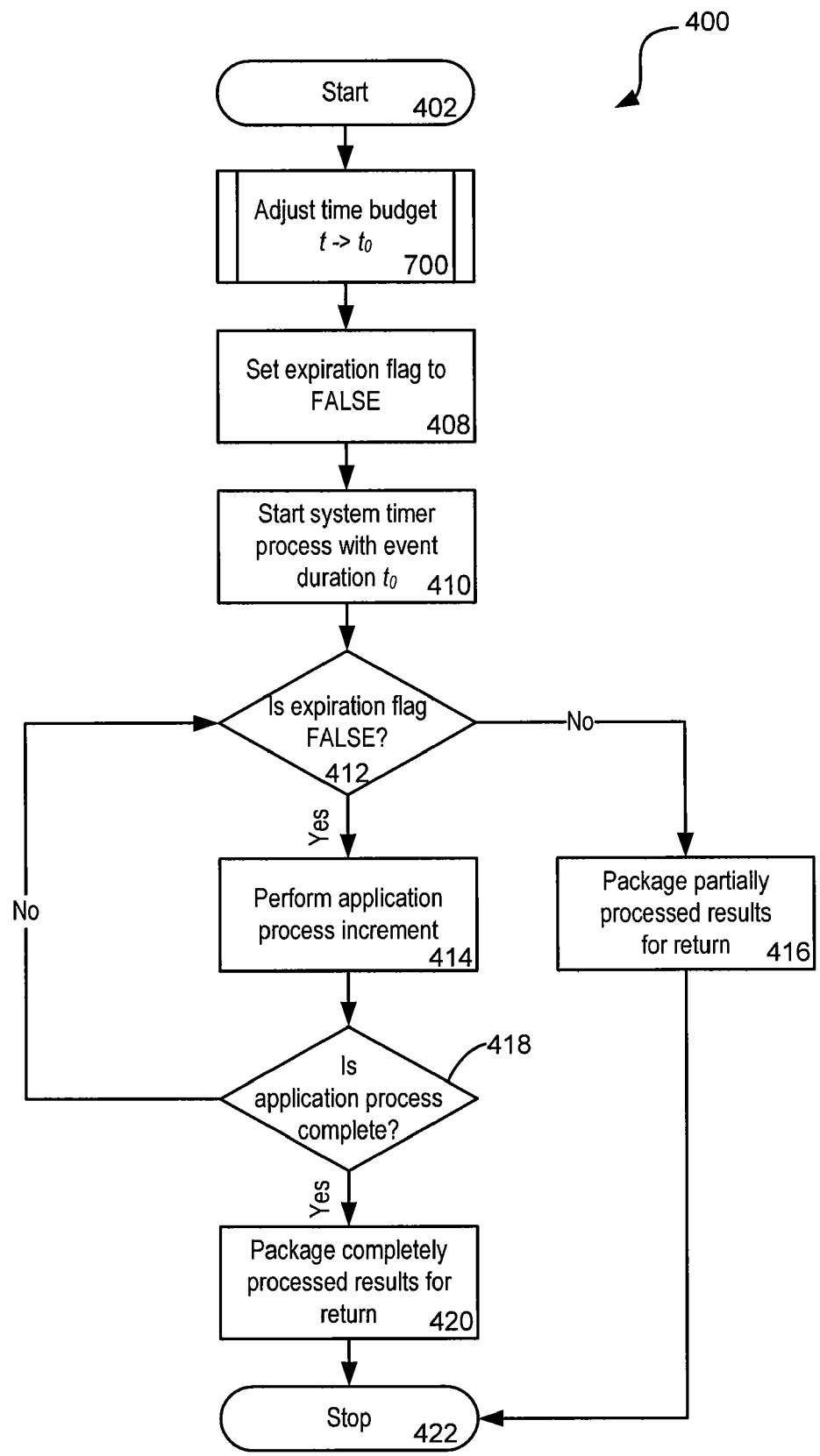
FIG. 4 is a functional block diagram illustrating the functionality of an application server employing a repetitive process in an example network content delivery system to which implementations of the invention have application.

FIG. 4 illustrates an example process 400 that can be implemented by server host 120 where the application task to be performed involves recursion or repetition. As FIG. 4 illustrates, in a particular implementation, server host 120 initiates (402) process 400 when it receives a request from client host 110. Time budget t is adjusted and recorded as adjusted time budget $t_0$ (700). The procedure for adjusting time budget t is discussed in detail below with reference to FIG. 7. Process 400 sets an expiration flag to FALSE to denote that the budget time for process 400 has not yet expired (408). An operating system timer is created and set to a duration of adjusted time budget $t_0$ (410). The operation of system timers is discussed in detail below with reference to FIG. 5. A loop and/or recursive application process is initiated with a check of the expiration flag (412). If the expiration flag is TRUE, execution of the loop and/or recursive application process is terminated, any partially processed results that may be available are packaged for return (416), and process 400 is terminated (422). If the expiration flag is still FALSE, execution continues and process 400 performs an incremental step in the application process (414). If the application process is not yet complete (418), control is passed back to the expiration flag check (412). If the application process is complete (418), the full results are packaged for return (420) and process 400 terminates (422).

Figure 5:
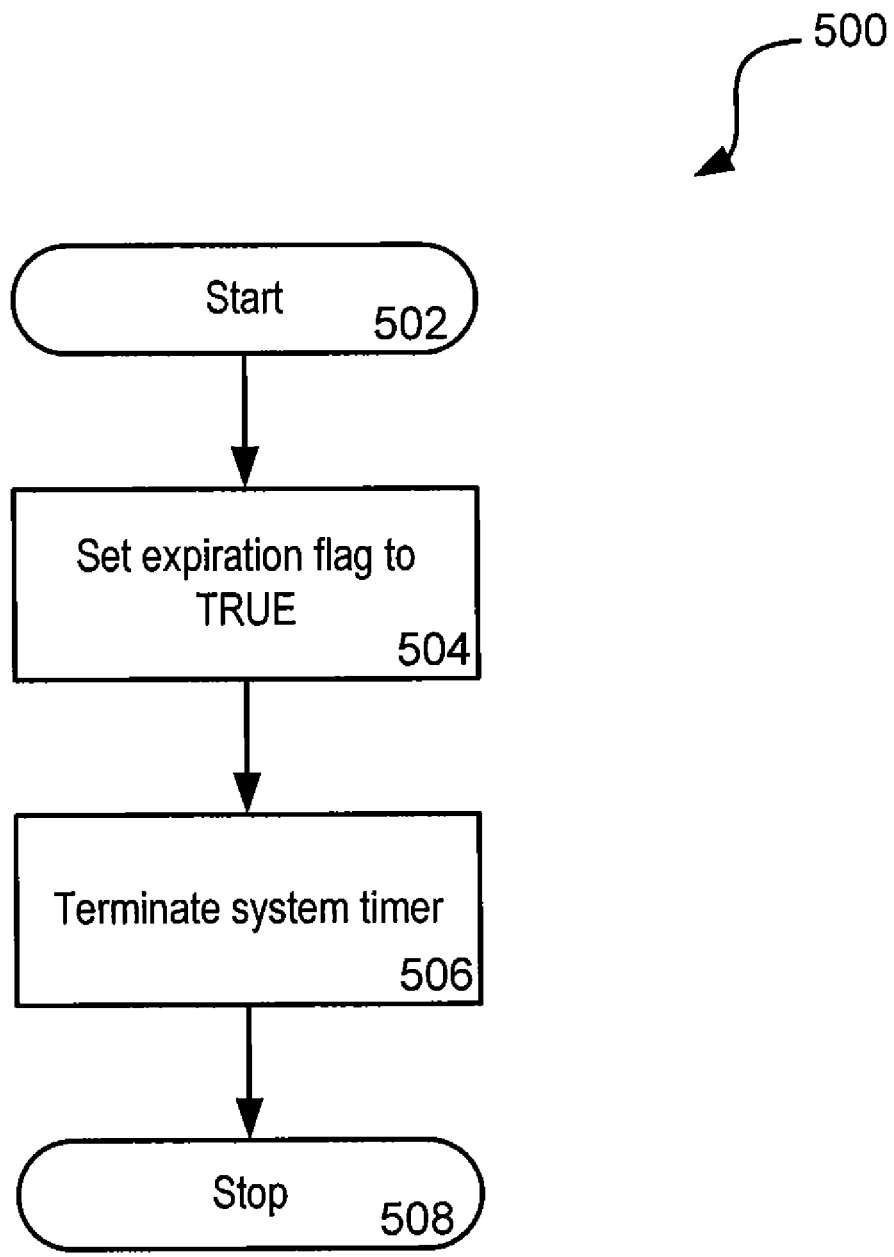
FIG. 5 is a functional block diagram illustrating the functionality of a system timer on an application server in an example network content delivery system to which implementations of the invention have application.

FIG. 5 illustrates an example process 500 that can be implemented by server host 120 as an operating system timer event handler according to one implementation. Typically, operating systems provide an Application Programming Interface (API) that allows the creation of system timers that trigger a timer event after expiration of an application-specified duration. One example operating system that supports this type of functionality is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. The timer event typically triggers an application process, such as process 500, asynchronously. As FIG. 5 illustrates, in a particular implementation, when the timer event is triggered (502) the timer event sets the expiration flag to TRUE (504), terminates the system timer process 500, and terminates the timer event (508).

Figure 6:
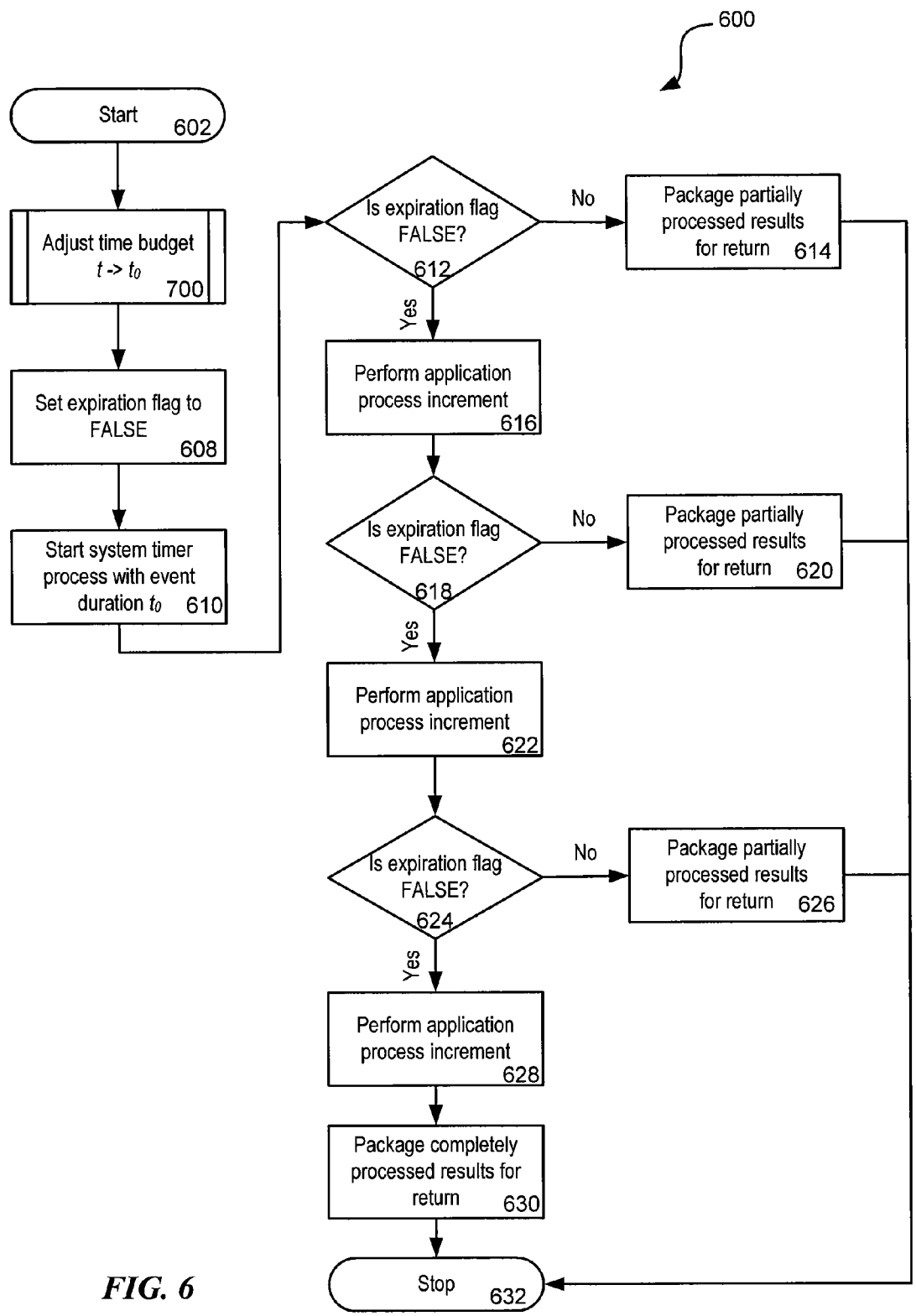
FIG. 6 is a functional block diagram illustrating the functionality of an application server employing a process involving discrete steps in an example network content delivery system to which implementations of the invention have application.

FIG. 6 illustrates an example process 600 that can be implemented by server host 120 where the application task to be performed comprises one or more unique steps. As FIG. 6 illustrates, in a particular implementation, server host 120 initiates (602) process 600 when it receives a request from client host 110. Time budget t is adjusted and recorded as adjusted time budget $t_0$ (700). The procedure for adjusting time budget t is discussed in detail below with reference to FIG. 7. Process 600 sets an expiration flag to FALSE to denote that the budget time for process 600 has not yet expired (608). An operating system timer is created and set to a duration of adjusted time budget $t_0$ (610). The operation of system timers is discussed in detail above with reference to FIG. 5. An application process that comprises a series of unique steps is initiated with a check of the expiration flag (612). If the expiration flag is TRUE, any partially processed results that may be available are packaged for return (614) and process 600 is terminated (632). If the expiration flag is still FALSE, execution continues and process 600 performs a first unique step in the application process (616). Process 600 continues with another check of the expiration flag (618), returns any partially processed results that may be available (620), and terminates process 600 (632) if the expiration flag is TRUE. If the expiration flag is FALSE, execution continues in like fashion with steps 624, 626, and 628. Once all unique steps are executed, a complete result is packages for return (630) and process 600 is terminated (632).

Figure 7:
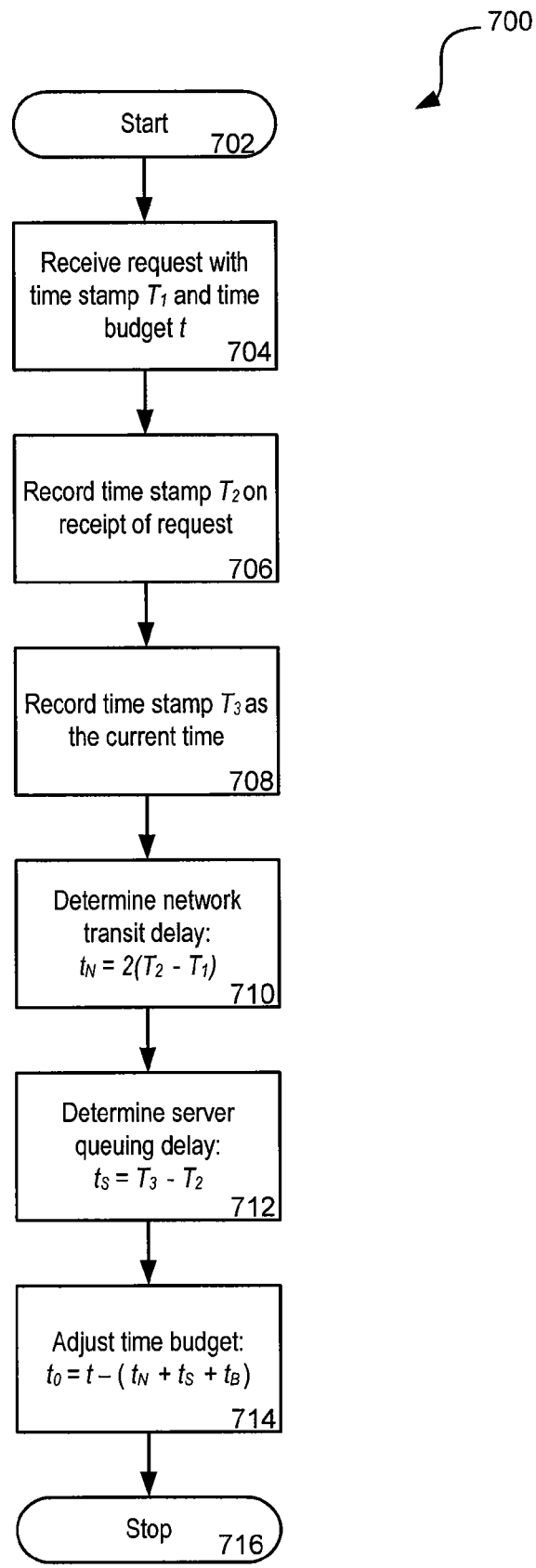
FIG. 7 is a functional block diagram illustrating adjustment of the time budget using network and system performance metrics, allocated to an application server in an example network content delivery system to which implementations of the invention have application.

FIG. 7 illustrates a procedure 700 that can be implemented by server host 120 to adjust time budget t to yield adjusted time budget $t_0$. As FIG. 7 illustrates, in a particular implementation, server host 120 initiates (702) process 700 with receipt (704) of time stamp $T_1$ and time budget t that were generated by client host 110 and, in one implementation, appended to or included in the request. In one implementation, the client host 110 transmits the request using a connectionless transport layer protocol, such as the User Datagram Protocol (UDP). In other implementations, the client host 110 may maintain an open transport layer connection, which does involve a connection handshake, and multiplex requests over the open transport layer connection. Server host 120 immediately generates time stamp $T_2$ (706). In one implementation, time stamp $T_2$ may be a time stamp recorded on a TCP/IP packet by the network interface card (NIC) belonging to server host 120 as the request sent to server host 120 by client host 110 arrives at server host 120. Time stamp $T_2$ may be generated by the NIC and stored in association with the received packet in a memory buffer accessible to the executable modules of server host 120. The NIC typically stores a pointer to the received packet in a ring or other queueing structure. Time stamp $T_3$ is recorded as the current system time (708) on server host 120 when the application executed on server host 120 accesses the packet(s) of the request. For example, a server application may generate time stamp $T_3$ when it receives a pointer to the packet(s) of the request stored in the memory buffer. If client host 110 and server host 120 are time-synchronized, a two-way network transit delay $t_N$ may be calculated as $t_N=2(T_2-T_1)$ (710). If client host 110 and server host 120 are not time-synchronized, a one way network transit delay $t_N$ can be set to some suitable default value. In a particular implementation, the network transit delay represents the amount of time required for the request generated by client host 110 to arrive at server host 120. In a particular implementation, a server queueing delay $t_S$ may be calculated as $t_S=T_3-T_2$ (712) to represent the amount of time required for the request to start processing on server host 120 after the request arrives (712). In a particular implementation, the incremental step 414, 616, 622, 628 of the application process may be bounded by a time limit $t_B$. An adjusted time budget (or "time limit") $t_0$ may be calculated by reducing time budget t so that $t_0=t-(t_N+t_S+t_B)$ (714). After time limit $t_0$ is determined, process 700 terminates (716).

Other implementations of the invention are also possible. For example, a process involving looping, recursion, and one or more unique steps in combination can be configured to return partially processed results upon expiration of a time budget t.

A.4. Example Computing System Architectures

While the foregoing systems can be implemented by a wide variety of physical systems and in a wide variety of network environments, the client and server host systems described below provide example computing architectures for didactic, rather than limiting, purposes.

Figure 8:
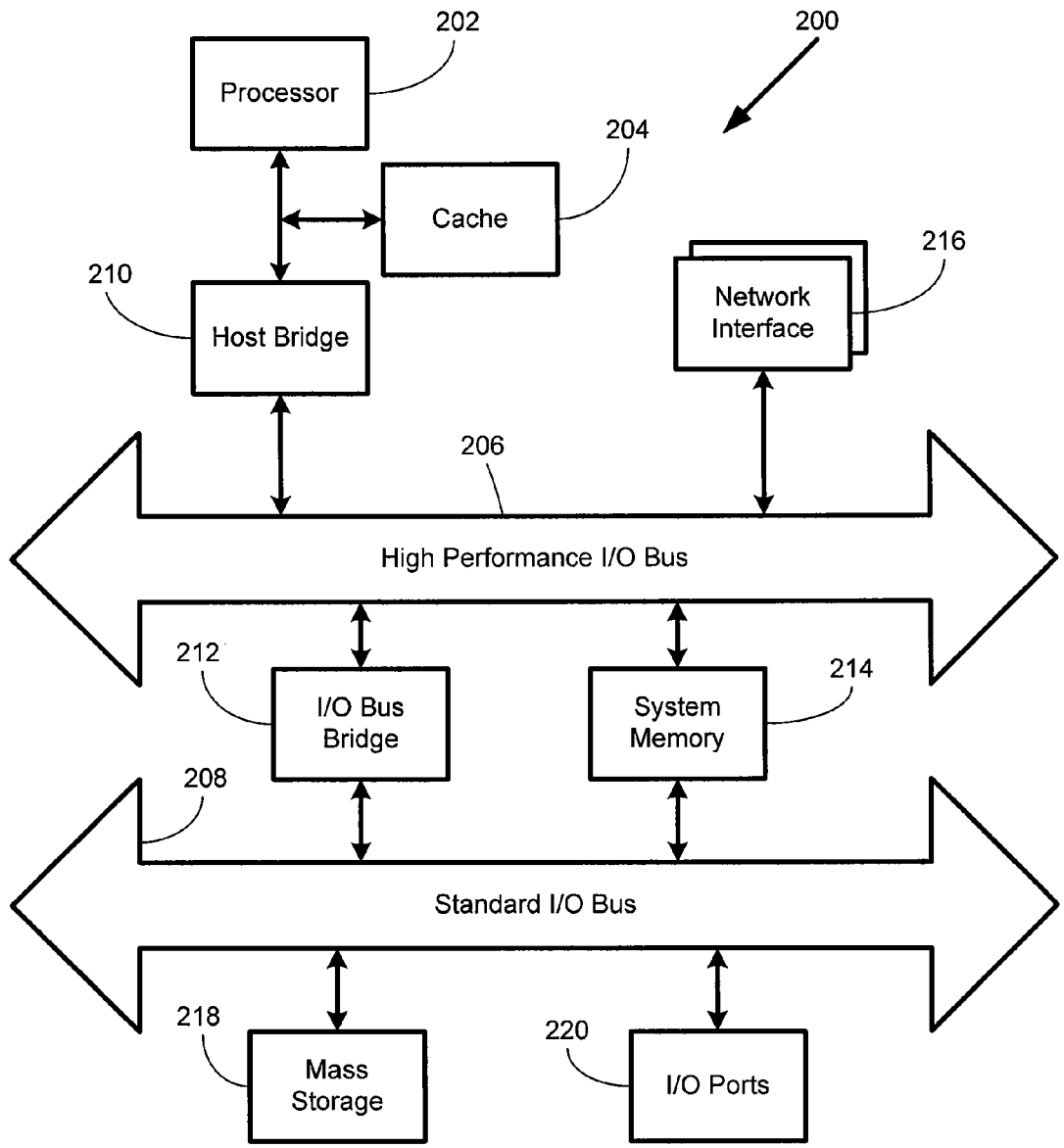
FIG. 8 is a schematic diagram illustrating an example computing system architecture that may be used to implement one or more of physical servers.

FIG. 8 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with HTML and HTTP, the present invention can be used in connection with any suitable protocol environment. Furthermore, implementations of the invention can be used in systems directed to serving god-targeted content other than ads to users. Other embodiments will be evident to those of ordinary skill in the art. It is therefore not intended that the present invention be limited, except as indicated by the appended claims.

What is claimed is:

1. A method for delivering partially processed content in network content delivery systems comprising:
    receiving a request for multimedia content from a client host, the request being associated with a time budget specifying an amount of time within which to return a response to the request;
    adjusting the time budget based on one or more of a network delay component, a server delay component, and a processing component;
    setting a time limit for processing a response to the request based on the adjusted time budget; and
    processing the response to the request for multimedia content, wherein in response to the time limit expiring prior to completion of the processing of the response, the partially processed content is transmitted to the client host.

2. The method of claim 1 further comprising:
    performing one or more processing operations to generate the response until the time limit expires or all processing operations have been performed.

3. The method of claim 1 wherein the client computer and the server computer are time synchronized.

4. The method of claim 3 wherein the network delay component is based on a time stamp generated by the client host when the request is sent and a time stamp generated from a server host when the request is received.

5. The method of claim 4 wherein the time stamp generated by the client host is included in the request.

6. The method of claim 4 wherein the time stamp generated by the server host is recorded in a data structure by a network interface of the server host when the request is received by the server host.

7. The method of claim 6 wherein the network delay component is twice the difference between the time stamp generated by the server host and the time stamp generated by the client host.

8. The method of claim 1 wherein the processing component is a suitable default value.

9. The method of claim 1 wherein the client computer and the server computer are not time synchronized.

10. The method of claim 9 wherein the network delay component is a suitable default value.

11. The method of claim 1 wherein the server delay component is based on a time stamp generated by the server host when the request is received and a time stamp generated by the server host when the request begins processing.

12. The method of claim 11 wherein the time stamp generated by the server host when the request is received is recorded in a data structure by the network interface of the server host when the request is received by the server host.

13. The method of claim 12 wherein the server delay component is the difference between the time stamp generated by the server host when the request begins processing and the time stamp generated by the server host when the request is received.

14. The method of claim 1 wherein the time limit for processing a response is the time budget less the network delay component, the server delay component, and the processing component.

15. An apparatus comprising:
    a memory;
    a network interface operative to generate time stamps responsive to receipt of packets comprising a request for multimedia content, read received packets into the memory, associate the generated time stamps to the packets read into the memory, and store pointers to the received packets on a processing queue;
    a processor; and
    a server module, stored on a storage medium, comprising computer-readable instructions operative to cause the processor to:
        access the processing queue to select a packet for processing; and
        process a request embodied in the selected packet by
            identifying an initial time budget specifying an amount of time within which to respond to the request,
            adjusting the initial time budget based on one or more of a network delay component, a server delay component, and a processing component,
            setting a time limit for processing a response to the request based on the adjusted time budget, and
            initiating transmission of partially processed multimedia content to the client host in response to the time limit expiring prior to completion of the processing of the response.

16. The apparatus of claim 15, wherein the server module is capable of performing one or more processing operations to generate the response until the time limit expires or all processing operations have been performed.

17. The apparatus of claim 15, wherein the one or more server modules comprise one or more client hosts and one or more server hosts.

18. The apparatus of claim 17, wherein the client host time is synchronized with the server host.

19. The apparatus of claim 18, wherein the network delay component is based on a time stamp generated by the client host in response to the request being sent and a time stamp is generated from a server host in response to the request being received.

20. The apparatus of claim 19, wherein the time stamp generated by the client host is included in the request.

21. The apparatus of claim 19, wherein the time stamp generated by the server host is recorded in a data structure by the network interface of the server host in response to the request being received.

22. The apparatus of claim 21, wherein the network delay component is calculated as twice a difference between the time stamp generated by the server host and the time stamp generated by the client host.

23. The apparatus of claim 15, wherein the processing component is set to a suitable default value.

24. The apparatus of claim 17, wherein the client host is not time synchronized with the server host.

25. The apparatus of claim 24, wherein the network delay component is set to a default value.

26. The apparatus of claim 17, wherein the server delay component is based on a time stamp generated by the server host in response to the request being received and a time stamp is generated by the server host in response to the request beginning processing.

27. The apparatus of claim 26, wherein the time stamp generated by the server host in response to the request being received is recorded in a data structure by the network interface of the server host in response to the request being received by the server host.

28. The apparatus of claim 27, wherein the server delay component is calculated as a difference between the time stamp generated by the server host in response to the request beginning processing and the time stamp generated by the server host in response to the request being received.

29. The method of claim 15 wherein the time limit for processing a response is the time budget less the network delay component, the server delay component, and the processing component.

30. A non-transitory computer-readable storage medium for delivering partially processed content in network content delivery systems, the logic embodied in a computer-readable medium and operable to:
- process a request for multimedia content from a client host, the request associated with a time budget specifying an amount of time within which to respond to the request;
- adjust the time budget based on one or more of a network delay component, a server delay component, and a processing component;
- set a time limit for processing a response to the request based on the adjusted time budget; and
- process the response to the request for multimedia content, wherein in response to the time budget expiring prior to completion of the processing of the response, the partially processed content is transmitted to the client host.

31. The method of claim 1, wherein the multimedia content comprises advertising content.

* * * * *